US006743467B1

(12) United States Patent
Jones et al.

(10) Patent No.: US 6,743,467 B1
(45) Date of Patent: Jun. 1, 2004

(54) HYDROPHOBIC MATERIAL

(75) Inventors: Ashley Jones, Sydney (AU); Robert Norman Lamb, Sydney (AU); Hua Zhang, Sydney (AU)

(73) Assignee: Unisearch Limited, Sydney (AU)

( * ) Notice: Subject to any disclaimer, the term of this patent is extended or adjusted under 35 U.S.C. 154(b) by 0 days.

(21) Appl. No.: 10/049,900

(22) PCT Filed: Aug. 21, 2000

(86) PCT No.: PCT/AU00/00993

§ 371 (c)(1),
(2), (4) Date: May 1, 2002

(87) PCT Pub. No.: WO01/14497

PCT Pub. Date: Mar. 1, 2001

(30) Foreign Application Priority Data

Aug. 20, 1999 (AU) .............................................. PQ2345

(51) Int. Cl.⁷ ................................................. B05D 3/02
(52) U.S. Cl. ....................................... 427/180; 427/387
(58) Field of Search .................................. 427/387, 180

(56) References Cited

FOREIGN PATENT DOCUMENTS

| EP | 0 381 376 | | 8/1990 |
|----|-----------|---|--------|
| EP | 0 430 156 | | 6/1991 |
| EP | 0 881 269 A2 | | 12/1998 |
| EP | 1186640 | * | 3/2002 |
| JP | 5-1391 | | 1/1993 |
| JP | 5-93170 | | 4/1993 |
| JP | 06-092621 | * | 4/1994 |
| JP | 10-13302 | | 5/1998 |

* cited by examiner

*Primary Examiner*—Erma Cameron
(74) *Attorney, Agent, or Firm*—Larson & Taylor PLC

(57) ABSTRACT

A method is provided for forming a modified gel capable of forming a hydrophobic surface on which water has a contact angle of at least 150°. Additionally, a method is provided for forming a hydrophobic coating from the modified gel. In some embodiments, the hydrophobic coating has an extremely high hydrophobicity with a contact angle in excess of 165°, and good substrate adhesion. The method involves bonding a gel with particulate matter. It is believed that the chemical hydrophobicity of the gel is enhanced by the physical roughness of the particulate matter.

40 Claims, 1 Drawing Sheet

HYDROPHOBIC MATERIAL

TECHNICAL FIELD

The invention relates to the technology of coatings. In particular, the invention relates to coating materials which are hydrophobic, and to methods for making coatings from those materials.

BACKGROUND ART

Hydrophobic coatings are water-proof coatings which have immediate uses in reducing icing and fouling of other surface. Such coatings can also render protected surfaces resistant to attachment by water soluble electrolytes such as acids and alkalies, and by microorganisms.

In the past, surfaces have been protected against encrustation, corrosion, icing and fouling by means of coatings containing polymer films, hydrophobic solid fillers and hydrophobic liquids. One disadvantage of the use of such coatings is that they do not achieve multi-purpose protection since they are not generally versatile enough to protect against damage from a variety of causes.

It is well understood that the wettability of various materials is dependent on both the physical and chemical heterogeneity of the material. The notion of using the contact angle θ made by a droplet of liquid on a surface of a solid substrate as a quantitative measure of the wetting ability of the particular solid has also long been well understood. If the liquid spreads completely across the surface and forms a film, the contact angle θ is 0°. If there is any degree of beading of the liquid on the surface of the substrate, the surface is considered to be non-wetting. For water, the substrate surface is usually considered to be hydrophobic if the contact angle is greater than 90°.

Examples of materials on which liquid droplets have high contact angles include water on paraffin, in which there is a contact angle of about 107°. Many applications require a hydrophobic coating with a high contact angle of at least 150°, and preferably at least 165°.

A "gel" is a substance that contains a continuous solid skeleton enclosing a continuous liquid phase. The liquid prevents the solid from collapsing, and the solid prevents the liquid from escaping. The solid skeleton can be formed by linking colloidal particles together.

The present inventors have now developed methods for producing materials which, when coated on a surface, render that surface hydrophobic.

SUMMARY OF THE INVENTION

In a first aspect, the present invention provides a method of forming a material capable of being applied to a surface, the method including the steps of:

(a) providing precursors capable of reacting to form a gel;
(b) reacting the precursors together to form the gel;
(c) adding a particulate material to the gel to form a mixture, the particulate material being capable of chemically bonding with the gel; and
(d) treating the mixture such that a modified gel is formed in which the particulate material is bound to the gel, and the modified gel is capable of forming a surface which is chemically hydrophobic and has a surface roughness which physically enhances the surface hydrophobicity, such that water has a contact angle on the surface of at least 150°.

In a second aspect, the present invention provides a method of forming a coating on a substrate, the method including steps (a) to (d) of the first aspect of the present invention, and further including the steps of:

(e) applying the modified gel to the substrate; and
(f) treating the applied modified gel such that a coating is formed on the substrate, the coating having a surface which is chemically hydrophobic and has a surface roughness which physically enhances the surface hydrophobicity, such that water forms a contact angle of at least 150°.

Preferably, the hydrophobic surface defined in either the first or the second aspect of the present invention is such that water forms a contact angle of at least 155° on it. More preferably, the contact angle is at least 160°. Even more preferably, the contact angle is at least 165°.

The hydrophobicity of the hydrophobic material when applied to a surface is preferably due to both the chemical properties of the modified gel and physical roughness of the material. It is envisaged that the modified gel of the first aspect of the present invention could be used to make solid materials in a range of possible forms, including bulk materials, thick coatings, and thin films.

The gel functions as a cross-linking agent which binds the particulate material, and attaches the modified gel to the substrate if required. Any known process for forming a gel may be used. Typically, the precursors defined in step (a) of the first and second aspects of the present invention at least include water, a solvent, and a metal alkoxide such as one of the following:

tetramethoxysilane (abbreviated TMOS), $Si(OCH_3)_4$
tetraethoxysilane (abbreviated TEOS), $Si(OCH_2CH_3)_4$;
titanium tetraisopropoxide, $Ti(O\text{-iso-}C_3H7)_4$;
titanium tetramethoxide, $Ti(OCH_3)_4$;
titanium tetraethoxide, $Ti(OC_2H_5)_4$;
titanium tetrabutoxide, $Ti[O(CH_2)_3CH_3]_4$;
zirconium n-butoxide, $Zr(O\text{-n-}C_4H_9)_4$.

The solvent may comprise an alcohol such as methanol, ethanol, isopropanol, or butanol. Alternatively, the solvent may comprise hexane or diethyl either.

For example, silicate gels may be synthesised by hydrolysing an alkoxide dissolved in an alcohol with a mineral acid or base, or organic acid or base. The end product is a silicon dioxide network.

Step (b) of reacting the precursors together in the first and second aspects of the invention may be implemented by refluxing the precursors for an extended period, such as a period in the range from 4 hours to 24 hours.

The particulate material defined in step (c) of the first and second aspects of the invention may consist of particles having substantially equal diameters, or alternatively having a spectrum of diameters. Preferably, at least some of the particles have diameters within a range from 1 nm to 500 μm. More preferably, the range is from 1 nm to 100 μm. Still more preferably, the range is from 1 nm and 1 μm. Still more preferably, the range is from 1 nm and 100 nm, and even more preferably the range is from 5 nm and 50 nm. In one embodiment, the particulate material consists of particles with diameters in a range from 1 nm to 500 μm. In a further embodiment, the primary particle diameter of the particulate component is the range from 5 nm to 50 nm. In yet a further embodiment, the average particle size is in the range from 5 nm to 20 nm. In yet a further embodiment, the average particle size is about 15 nm.

Step (d) of the first and second aspects of the invention may be implemented by firstly thoroughly mixing the mixture, such as in an ultrasonic bath. Optionally, an alcohol such as isopropanol may be added to the mixture during this step to aid in dispersing the particulate material. Secondly, the mixture may be refluxed to cause chemical bonding between the particulate material and the gel.

Step (e) of applying the modified gel to a substrate may be carried out by any known technique of forming a coating from a liquid, such as spin coating, dip coating or spray coating.

Step (f) may involve drying the applied modified gel until a solid coating is formed. There may be solvents which need to be removed from the modified gel, and in such a case, the drying may include heating the applied modified gel to a temperature which is at least high enough to evaporate the solvents. It will be appreciated that the drying temperature will depend on the melting point of the substrate and the type of gel. The drying time for a particular application will usually depend on the temperature used, and to some extent on the thickness of the coating. In the case of silica coatings, it has been found that a heating temperature of in the range from 120° C. to 400° C. over a period of 10–30 minutes is suitable when the substrate is capable of withstanding such a temperature. Vacuum drying, or a combination of vacuum drying and heating, may be preferable when the substrate has a low melting point.

Elasticity and flexibility of the coating may be enhanced by adding a polymer component to the gel during step (c). Alternatively, the polymer component may be added to the gel either directly before or directly after step (c). The polymer component preferably bonds with the gel and particulate material during step (d), and is preferably either hydrophobic, or rendered hydrophobic by the reaction in step (d).

Where a polymer component is mixed into the gel, the method may further include a step prior to step (d) of adding a surface modifier to the gel for enhancing the intrinsic chemical hydrophobicity of the hydrophobic surface. The surface modifier may additionally enhance bonding between the gel and particulate material. The surface modifier may be a compound containing one or more condensation cure groups and one or more hydrophobic groups. The one or more condensation cure groups may include one or more of the following groups: acetoxy; enoxy; oxime; alkoxy; or amine. The surface modifier may comprise $SiR(OAc)_3$, where R is a hydrophobic group such as methyl, ethyl, vinyl, or trifluoropropyl, and Ac is an acetyl group. In a preferred embodiment, the particulate material comprises silica, the gel comprises a silicate gel, and the surface modifier comprises methyltriacetoxysilane. The step of adding the surface modifier may take place either immediately before step (c), during step (c), or immediately after step (c).

The gel, the particulate material, and optionally the polymer component, preferably form a slurry when mixed and reacted together in step (d) of the first and second aspects of the invention.

In a preferred embodiment, the particulate material consists of flame-hydrolysed silica powder, and the gel precursors include a compound capable of forming a silicon dioxide gel, such as either TMOS or TEOS. A suitable polymer component in this case is polydimethylsiloxane (PDMS), a polymer with hydroxyl groups terminating the ends of each chain. The resultant modified gel consists of silica particles chemically bound to a siloxane network, and surrounded by liquid.

Flame-hydrolysed silica powder is relatively inexpensive and commercially available as Aerosil™ silica powder from Degussa Limited with particles having a primary size in the range of 5–50 nm. Although flame-hydrolysed silica particles are initially hydrophilic, the surface chemistry is changed during step (d) by converting silanol functional groups ($\equiv$Si—OH) on the surfaces of the particles, to siloxane bonds ($\equiv$Si—O—Si$\equiv$). This interaction has the advantage of rendering the particles hydrophobic through reaction with the PDMS or a surface modifier. A modified gel made in this way is particularly hydrophobic for two reasons. Firstly, the chemical properties of siloxane bonds make it inherently hydrophobic. Secondly, the small size of the particles in the flame-hydrolysed silica gives the modified gel a small-scale roughness which increases the hydrophobicity of the silicon dioxide.

Although silica and silica-based particles are preferred, other materials of hydrophobic character which can be prepared with a sufficiently small particle size could be used in conjunction with a hydrophobic gel capable of bonding to the particles. Examples include particles and gels formed from a metal oxide, such as titanium dioxide. For instance, titanium dioxide particles could be reacted with a titanium dioxide gel formed from titanium tetraisopropoxide.

A specific embodiment of the first and second aspects of the invention will now be described. In step (a) the precursors are 5 g of TEOS, 1.7 g of water acidified with HCl to a pH of approximately 4, and 2.7 g of ethanol. In step (b) the mixture is refluxed for 6–36 hours to form a silica gel. In step (c) the particulate material added to the gel is 0.5 g to 2.5 g of flame-hydrolysed silica powder, forming a mixture. About 0.5 g to 5 g of PDMS and approximately 50 g of isopropanol is then added to the mixture. In step (d), the reactants are mixed well and vibrated in an ultrasonic bath for 15 to 30 minutes, forming a uniform slurry. The slurry is then allowed to reflux for another 6–24 hours to make the silica gel chemically bond with the silica powder and PDMS. The slurry is the modified gel which can be used to form a coating according to the second aspect of the present invention. In a preferred embodiment, step (e) includes depositing drops of the slurry onto a substrate while the substrate is spinning. Typical substrates are metals, glasses, and ceramics. The substrate is spun at spin rate of 1000 to 2000 rpm. In step (f) the coated substrate is placed in an oven at a temperature of about 400° C. for 10 to 30 minutes.

In a third aspect, the present invention provides a modified gel produced by the method according to the first aspect of the present invention.

In a fourth aspect, the present invention provides an object having a surface, at least a portion of which is coated with a hydrophobic coating formed from a modified gel made by the method according to the first aspect of the present invention.

In a fifth aspect, the present invention provides a hydrophobic coating produced by the method according to the second aspect of the present invention.

In a sixth aspect, the present invention provides an object having a surface, at least a portion of which is coated with a hydrophobic coating produced by the method according to the second aspect of the present invention.

In a seventh aspect, the present invention provides a use of the method according to the second aspect of the present invention to coat at least a portion of a surface of an object.

Surfaces which can be treated with the hydrophobic coating include metals, alloys, glasses, ceramics, composites, but can also include other materials. The surface treatment can be used to inhibit corrosion or the formation of crystallisation centres. The treatment can be used to prevent icing on surfaces, to produce anti-griping hydrophobic coatings for aboveground fixed facilities such as buildings and other structures, to provide anti-icing and anti-corrosion coatings for aircraft, or to provide anti-icing, anti-fouling and anti-corrosion coatings for maritime and inland waterway vessels. A hydrophobic anti-fouling coating formed from silica has the advantage that it much less toxic to the marine environment than most currently-available coatings.

Other uses include increasing the resistance of roofs to microflora colonisation. The hydrophobic coatings may also be used for extending the survivability, performance, and reliability of instruments and equipment.

Still other uses envisaged for the hydrophobic coatings include reducing drag in vessels such as canoes, yachts, ships, and other watercraft, improving the corrosion resistance of cooling systems in internal combustion engines utilising closed heat exchangers having liquid heat transfer agents, providing anti-corrosive and anti-icing coatings for undercarriages of vehicles such as tractors and combines and for agricultural machinery in general.

The hydrophobic coating according to the present invention may also be used to waterproof building foundations and structures and radioactive waste storage facilities, extend the operating service life of water cooling towers, protect railroad ties from microflora, provide anti-icing coatings for cooling chambers, refrigerators and chillers, extend the life cycle of hydroelectric power dams, and improve the efficiency of wind-driven motors. Metal parts coated in the hydrophobic coating would be less prone to rust because water would be repelled from the metal surface. The hydrophobic coating could also be used on windows, such as car windscreens, if the coating is largely transparent to visible light.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

In order that the present invention may be more clearly understood, embodiments will be described with reference to the following examples and the accompanying drawings.

MODES FOR CARRYING OUT THE INVENTION

Figure 1:
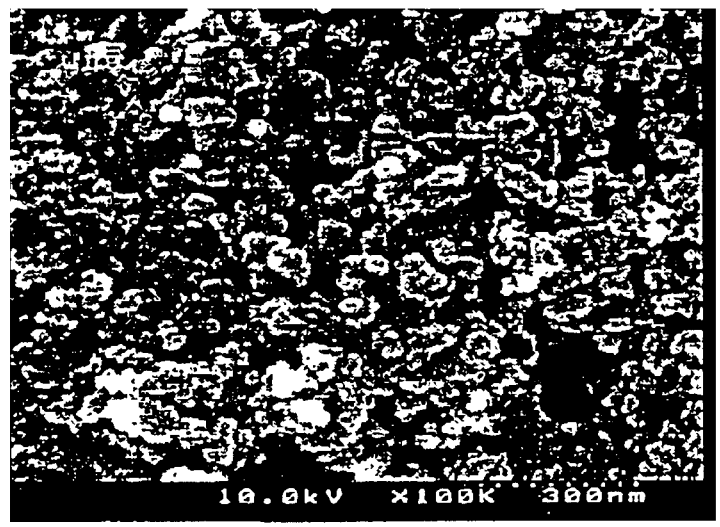
FIG. 1 is an image produced by a scanning electron microscope at a magnification of 5,000 for a silica hydrophobic coating.

A method of making a silica-based hydrophobic coating will now be described. The two fundamental chemical reactions of the sol-gel process in this case are:

(1) hydrolysis,
≡Si(OR)+H$_2$O→≡Si(OH)+ROH; and
(2) condensation,
≡Si(OR)+≡Si(OH)→≡Si-O-Si≡+ROH
(alcohol-producing), and
≡Si(OH)+≡Si(OH)→≡Si-O-Si≡+H$_2$O (water-producing).

The hydrolysis and condensation reactions are usually concurrent.

The precursor used for preparing the gel is tetraethoxysilane (Si(OCH$_2$CH$_3$)$_4$), and the particulate material is flame-hydrolysed silica powder (Aerosil™ silica). The silica powder has a primary particle size of 5 to 50 nm, and the specific surface of the powder is about 50–600 m$^2$/g. The large specific surface is an important characteristic of the silica since it influences the surface roughness of a coating, and is thereby linked to the hydrophobicity of the coating.

The polymer component is polydimethylsiloxane (PDMS):

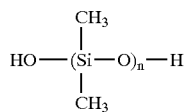

PDMS is a polymer which is unusually resistant to heat, being able to withstand temperatures up to about 400° C. without deformation. It also has high electrical resistance, and is able to withstand outdoor exposure to UV radiation with little or no deformation or degradation for at least 10 years. PDMS is terminated with hydroxyl groups which function as sites where the PDMS chains are able to react with and bond to the silica gel or silica particles. The PDMS becomes hydrophobic when the hydroxyl groups are removed. The PDMS used in this embodiment has a viscosity of about 90–20,000 cSt.

The modified gel is preferably formed as a slurry which can then be applied to a substrate to form a coating. Known techniques for forming conventional gel coatings can be used. One technique is to paint the slurry onto a substrate, but the uniformity of the coating produced is variable. A second technique is dip coating. The substrate is immersed in the slurry and withdrawn at a particular rate. A third technique is spin coating. In this technique, the substrate is attached to horizontal platform capable of spinning at a high rate, such as a few thousand rpm. The slurry is deposited drop-wise onto the substrate whilst it is spinning, and results in a highly uniform coating. The coating thickness can be controlled by adjusting the spin rate or the volume of slurry deposited. A further coating method is spray coating. A spray solution of the slurry is sprayed onto a substrate at an appropriate distance, flow rate and length of time such that a uniform coating of adequate thickness is formed.

EXAMPLE 1

A silica hydrophobic coating has been prepared using the following procedure:

Mix together:
  5 g of TEOS;
  1.7 g of water, acidified with HCl to a pH of approximately 4; and
  2.7 g of ethanol. Reflux the mixture for about 6–36 hours to form the silica gel.
Add to the mixture:
  0.5 to 5 g of PDMS with viscosity of 90–150 cSt;
  0.5 to 2.5 g of Aerosil™ 200 (flame-hydrolysed silica powder with an average individual particle of size 15 nm) obtained from Degussa Limited; and
  approximately 50 g of isopropanol.
Mix the reactants well and vibrate in an ultrasonic bath for 15 to 30 minutes to disperse the particles and form a uniform slurry. Typical vibration frequencies of about 40 kHz are sufficient.
Remove the reactants from the ultrasonic bath, and reflux for about 6 hours. The resultant slurry is now suitable for preparing hydrophobic coatings.

Deposit drops of the slurry onto a substrate using spin coating. A spin rate of 1000 to 2000 rpm has been found to be sufficient, but will depend on the viscosity of the slurry, the coating thickness required, and the surface of the substrate. A range of substrate types can be used, including metals, glasses, silicon, ceramics, polymers, and composites. However, the substrate should be reasonably flat.

Place the coated substrate in an oven at a temperature of about 400° C. for 10 to 30 minutes.

Figure 2:
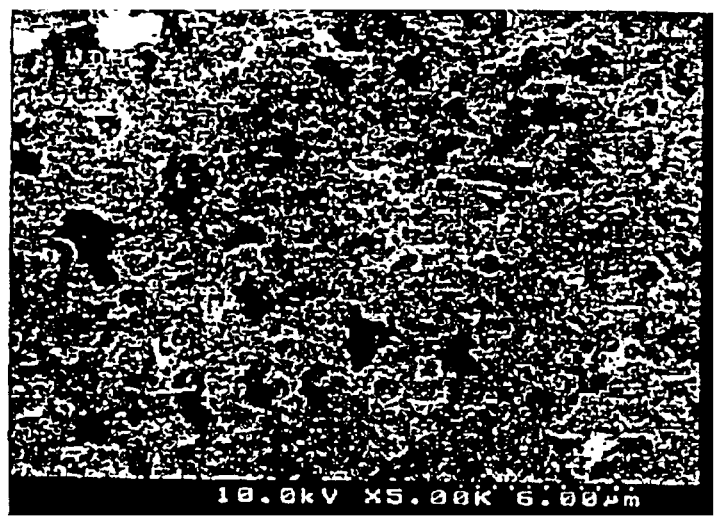
FIG. 2 is higher magnification scanning electron microscope image (×100,000) for the same hydrophobic coating shown in FIG. 1.

FIGS. 1 and 2 show scanning electron microscope images of the surface of a hydrophobic coating produced using the above technique. The surface is viewed at a magnification of 5,000 (FIG. 1) and 100,000 (FIG. 2). It is clear from the images that the coating has an extremely rough surface. Moreover, the dimensions of the surface roughness span at least three orders of magnitude, ranging from tens of nanometers to tens of microns.

EXAMPLE 2

In this comparative example, example 1 was repeated except that the amount of Aerosil 200 was changed to 1.5 g. With the higher PDMS/Aerosil ratio, there should be more bonding between silica particles without decreasing the hydrophobicity.

EXAMPLE 3

In this comparative example, example 1 was repeated except that the amount of TEOS was reduced from 5 g to 2.5 g. It was found that with less TEOS acting as a cross-linking agent, the hydrophobicity of the coating does not decrease. With a comparatively higher PDMS content in this coating, the flexibility of the coating might increase. However, the durability of the coating might decrease due to less bonding between silica particles, and between particles and the substrate.

EXAMPLE 4

In this comparative example, example 2 was repeated except that the amount of TEOS was reduced from 5 g to 2.5 g. It was found that with this moderate TEOS/Aerosil ratio and PDMS/Aerosil ratio, the final coating possesses good durability and flexibility.

EXAMPLE 5

In this comparative example, example 1 was repeated except that the viscosity of PDMS used was increased from 90–150 cSt to 2,000 cSt. With longer PDMS chains in the coating, the flexibility of the coating might increase.

EXAMPLE 6

In this comparative example, example 2 was repeated except that the viscosity of PDMS used was increased from 90–150 cSt to 2,000 cSt.

EXAMPLE 7

In this comparative example, example 3 was repeated except that the viscosity of PDMS used was increased from 90–150 cSt to 2,000 cSt.

EXAMPLE 8

In this comparative example, example 4 was repeated except that the viscosity of PDMS used was increased from 90–150 cSt to 2,000 cSt.

EXAMPLE 9

In this comparative example, example 1 was repeated except that the viscosity of PDMS used was increased from 90–150 cSt to 20,000 cSt or higher. With even longer PDMS chains in the coating, the flexibility of the coating might increase further.

EXAMPLE 10

In this comparative example, example 2 was repeated except that the viscosity of PDMS used was increased to 20,000 cSt.

EXAMPLE 11

In this comparative example, example 3 was repeated except that the viscosity of PDMS used was increased to 20,000 cSt.

EXAMPLE 12

In this comparative example, example 4 was repeated except that the viscosity of PDMS used was increased to 20,000 cSt.

EXAMPLE 13

In this comparative example, example 1 was repeated except that Aerosil 200 was replaced by Aerosil 8202 (average individual particle size of 17 nm), which was also obtained from Degussa Limited. It was found that with these particles the hydrophobicity of the resultant coating does not decrease substantially.

EXAMPLE 14

In this comparative example, example 1 was repeated except that the Aerosil 200 was replaced by tin oxide powder with an average particle size of about 300–500 nm. It was found that with the significant increase in particle size, the hydrophobicity of the coating decreased, but not substantially. This may suggest that hydrophobicity is influenced by surface roughness, and to a lesser extent by particle size.

EXAMPLE 15

In this comparative example, example 1 was repeated except that the Aerosil 200 was replaced by antimony(III) oxide powder with an average particle size of around 5,000 nm. It was found that this significant increase in particle size substantially decreased the hydrophobicity of the coating.

Table 1 below shows the results of contact angle measurements made on coatings produced in examples 1–14.

EXAMPLE 16

In this example, a silica hydrophobic coating was prepared using hexane instead of ethanol, and included a surface modifier.

A mixture comprising 1.5 g of tetraethylorthosilicate (TEOS), 150 mg of water (acidified by HCl to pH ~4), and 50 ml hexane was refluxed for 4 hrs. To this reaction system, the following were added: 2 g of PDMS with hydroxyl groups terminated (viscosity varied from 90–50,000 cSt); 0.5 g original Aerosil silica powder (not hydrophobically treated); 1.5 g of Methyltriacetoxysilane; and about 50 ml hexane. The reactants were mixed well and vibrated in an ultrasonic bath at a frequency of about 40 kHz for 15 to 30 minutes such that the particles were dispersed and a uniform slurry was formed. The reaction mixture was removed from the ultrasonic bath and the resultant slurry was used to form a hydrophobic coating using spray coating. During spray coating, the slurry is sprayed onto the substrate at an appropriate distance, flow rate, and length of time to form a uniform coating. After the substrate had been coated with the slurry, the so-formed hydrophobic coating was heat treated to remove the residue solvents. Curing can occur at 120–400° C. for 10–30 min. The contact angle of the coating was 155°.

TABLE 1

| Example No. | Contact Angle (degrees) |
|---|---|
| 1 | 167 |
| 2 | 164 |
| 3 | 167 |
| 4 | 153 |
| 5 | 158 |
| 6 | 174 |
| 7 | 169 |
| 8 | 145 |
| 9 | 164 |
| 10 | 158 |
| 11 | 172 |
| 12 | 170 |
| 13 | 159 |
| 14 | 151 |
| 15 | 115 |
| 16 | 155 |

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method of forming a material for application to a surface, said method comprising the steps of:
   (a) providing gel precursors;
   (b) reacting the precursors together to form a gel;
   (c) adding a particulate material to the gel to form a mixture, the particulate material being capable of chemically bonding with the gel; and
   (d) chemically treating the mixture such that a modified gel is formed in which the particulate material is bound to the gel, wherein the modified gel is chemically hydrophobic and has a surface roughness that physically enhances the surface hydrophobicity, such that water has a contact angle on the surface of at least 150°.

2. The method according to claim 1 wherein the modified gel has a contact angle with water of at least 155°.

3. The method according to claim 1 wherein the modified gel has a contact angle with water of at least 160°.

4. The method according to claim 1 wherein the modified gel has a contact angle with water of at least 165°.

5. The method according to claim 1 wherein the precursors provided in step (a) include at least water, a solvent, and a metal alkoxide.

6. The method according to claim 5 wherein the solvent comprises an alcohol.

7. The method according to claim 6 wherein the alcohol is selected from the group consisting of methanol, ethanol, isopropanol, and butanol.

8. The method according to claim 5 wherein the solvent is selected from the group consisting of hexane and diethyl ether.

9. The method according to claim 5 wherein the metal alkoxide is selected from the group consisting of tetramethoxysilane, tetraethoxysilane, titanium tetraisopropoxide, titanium tetrameahoxide, titanium tetraethoxide, titanium tetrabutoxide and zirconium n-butoxide.

10. The method according to claim 1 wherein step (b) of reacting the precursors together comprises refluxing the precursors for an extended period.

11. The method according to claim 1 wherein the particulate material comprises particles having substantially equal diameters.

12. The method according to claim 1 wherein the particulate material comprises particles having a spectrum of diameters.

13. The method according to claim 11 wherein at least some of the particles have diameters within a range from 1 nanometer to 1 micrometer.

14. The method according to claim 11 wherein at least some of the particles have diameters within a range from 1 nanometer to 100 nanometers.

15. The method according to claim 11 wherein substantially all particles have diameters within a range from 1 nanometer to 500 micrometers.

16. The method according to claim 11 wherein the particles have a primary particle diameter in a range from 5 nanometers to 50 nanometers.

17. The method according to claim 11 wherein the particles have an average particle size in a range from 5 nanometers to 20 nanometers.

18. The method according to claim 11 wherein the average particle size is about 15 nanometers.

19. The method according to claim 1 further comprising a step prior to step (d), the further step comprising mixing a polymer component into the gel, wherein the polymer component is suitable for bonding with the gel and particulate material and wherein said step (d) comprises bonding the polymer component with the gel and particulate material.

20. The method according to claim 19 wherein the polymer material is either hydrophobic or rendered hydrophobic during step (d).

21. The method according to claim 1 further comprising a step prior to step (d), the further step comprising adding a surface modifier to the gel, wherein the addition of said surface modifier increases the intrinsic chemical hydrophobicity of a hydrophobic surface formed with the modified gel.

22. The method according to claim 21 wherein the surface modifier further enhances bonding between the particulate material and the gel.

23. The method according to claim 21 wherein the surface modifier is a compound including one or more hydrophobic groups and one or more condensation cure groups.

24. The method according to claim 23 wherein the one or more hydrophobic groups include one or more selected from the group consisting of methyl, ethyl, vinyl, and trifluoropropyl.

25. The method according to claim 23 wherein the one or more condensation cure groups include one or more selected from the group consisting of acetoxy, enoxy, oxime, alkoxy, and amine.

26. The method according to claim 1 wherein the particulate material comprises a flame-hydrolyzed silica powder, and the gel comprises a silicon dioxide gel.

27. The method according to claim 19 wherein the polymer component comprises polydimethylsiloxane (PDMS).

28. A method of forming a coating on a substrate, said method comprising the steps of:
   forming a modified gel in accordance with the method of claim 1;
   applying the modified gel to the substrate; and chemically treating the applied modified gel such that a coating is formed on the substrate, wherein the coating has a surface that is chemically hydrophobic and a surface roughness that physically enhances the surface hydrophobicity, such that water forms a contact angle of at least 150°.

29. The method according to claim 28 wherein the hydrophobic surface of the coating is such that water forms a contact angle on it of at least 155°.

30. The method according to claim 28 wherein the hydrophobic surface is such that water forms a contact angle on it of at least 160°.

31. The method according to claim 28 wherein the hydrophobic surface is such that water forms a contact angle on it of at least 165°.

32. The method according to claim 1 wherein the modified gel is in the form of a slurry.

33. The method according to claim 28 wherein the step of applying the modified gel to the substrate comprises using one of the following techniques: spin coating, dip coating, or spray coating.

34. The method according to claim 28 wherein the step of treating the mixture comprises drying the applied modified gel such that a solid coating is formed.

35. The method according to claim 34 wherein the step of drying includes a step of heating the applied modified gel to a temperature which is sufficient to evaporate any solvents.

36. The method according to claim 34 wherein the step of drying the coating comprises heating the coating to a temperature in the range from 120° to 400° C.

37. A modified gel produced by a method in accordance with claim 1.

38. An object having a surface, at least a portion of which is coated with a hydrophobic coating formed from a modified gel made by a method in accordance with claim 1.

39. A hydrophobic coating produced by a method in accordance with claim 28.

40. An object having a surface, at least a portion of which is coated with a hydrophobic coating produced by a method in accordance with claims 28.

* * * * *